United States Patent Office 3,756,853
Patented Sept. 4, 1973

3,756,853
PROCESS FOR THE PRODUCTION OF NON-HAZING STARCH CONVERSION SYRUPS
Gilbert R. Meyer, Overland Park, Kans., assignor to CPC International Inc.
No Drawing. Filed Oct. 27, 1970, Ser. No. 84,518
Int. Cl. B01d 13/00; C13k 1/06, 1/08
U.S. Cl. 127—38    18 Claims

ABSTRACT OF THE DISCLOSURE

Process for the production of a non-hazing starch conversion syrup having a D.E. of from about 5 to about 18 which comprises first hydrolyzing starch to a D.E. of from about 20 to about 40 and thereafter subjecting the resulting starch conversion syrup to reverse osmosis until the D.E. of the syrup has been reduced to from about 5 to about 18.

---

The present invention relates to a process for the production of non-hazing, low D.E. starch conversion syrups.

The term D.E. is an abbreviation for dextrose equivalent, and is used herein to refer to the reducing value of dissolved solids in a starch hydrolysate expressed as percent dextrose, as measured by the Luff-Schorl method (NBS Circular C-40, page 195 as appearing in "Polarimetry, Saccharimetry and Sugars," authors Frederick J. Bates and Associates).

There is a large market for starch conversion syrups with bland taste, low sweetness and low hygroscopicity at a low D.E. value. Such syrups are useful as bases for the preparation of food items as well as for bodying agents and as additives having non-sweet, water-holding, non-hygroscopic characteristics. Other applications include their use as a carrier for synthetic sweeteners, as a flavor enhancer, as an additive for cloring agents, as a spray drying adjunct for coffee extracts or tea extracts, as a bulking, bodying or dispersing agent in synthetic creams or coffee whiteners, as moisture holding agents in breads, pastries, meats, and as a bodying and smoothing agent in puddings, soups and frozen iced desserts.

In many of the described applications, it is desirable to utilize a starch conversion syrup which exhibits extreme clarity and which will not develop haze upon standing. While such non-hazing characteristics were readily imparted to starch conversion syrups having high D.E. values such as above about 20, it has been difficult to produce low D.E. starch conversion syrups having non-hazing properties. Typically, starch conversion syrups having a D.E. below about 15 were subject to haze development upon standing. In extreme cases, such syrups became completely opaque and gelled into a paste. In less extreme cases, haze particles were found to agglomerate and settle to the bottom of the syrup, resembling a sludge. In other cases, haze particles are too fine and dispersed to agglomerate and merely remain in suspension, lending the syrup a cloudy appearance.

It has now been found that starch conversion syrups having a D.E. of from about 5 to about 15 can be prepared which do not haze or form suspended matter upon standing. More particularly, it has been found that non-hazing starch conversion syrups having a solids content of from about 60% to about 85% by weight and a D.E. of from about 5 to about 18 can be prepared by a process which comprises first hydrolyzing starch to a D.E. of from about 20 to about 40 and thereafter subjecting the resulting starch conversion syrup to reverse osmosis until the D.E. of the syrup has been reduced to from about 5 to about 18.

The initial starch, which is subjected to hydrolysate treatment, may be derived from a wide variety of starch materials, such as cereal starches, waxy starches, and/or root starches. Typical of these starches are corn starch, potato starch, tapioca starch, grain sorghum starch, waxy milo starch, waxy maize starch, and the like.

The hydrolyzing of the starch to a D.E. of from about 20 to about 43 can be carried out by acid, enzyme or a combination of acid and enzyme conversions. In one method, referred to in Example I as Method A, a starch such as a corn starch is treated with a single enzyme application of bacterial alpha-amylase. More specifically, an aqueous slurry of a starch, having a solids content less than about 50% by weight, is subjected to the hydrolytic action of bacterial alpha-amylase under suitable conditions to produce the starch hydrolysate.

The hydrolysis may also be performed via a number of other routes. For example, a mixture of starch and water having a solids content of less than about 50% by weight can be subjected to the hydrolytic action of acid at a pH of from 1 to about 4 until a D.E. of from about 20 to about 43 is reached. In another route, a mixture of starch and water having a solids content less than 50% may be first subjected to the hydrolytic action of a bacterial alpha-amylase followed by a high temperature heating step to solubilize any insoluble starch. Since this temperature tends to inactivate the enzyme, it is then necessary to cool the solubilized partial hydrolysate and subject it to a second hydrolysis by treatment with additional bacterial alpha-amylase to obtain the final starch hydrolysate having a D.E. of from about 20 to about 43. This method is referred to as the enzyme-enzyme technique in Method B of Example I.

In a preferred embodiment, the enzyme-enzyme technique comprises slurrying starch in water to a solids concentration of between about 10% and about 50%; solubilizing the starch above the gelatinization temperature of the starch; gelatinization; subjecting the mixture to treatment with bacterial alpha-amylase to hydrolyze the starch to a D.E. between about 5 and about 15; heating the starch hydrolysate to a temperature greater than about 95° C. and, preferably, between about 110° C. and 150° C.; cooling the starch hydrolysate to a temperature less than 95° C.; and subjecting the hydrolysate to further treatment with additional bacterial alpha-amylase or saccharifying enzyme to hydrolyze the starch to a D.E. between about 20 and 43.

A further method of hydrolyzing starch comprising an acid-enzyme technique referred to as Method C in Example I, consists of hydrolyzing a mixture of starch and water by the action of acid to reach a D.E. between about 5 and about 15. The partial hydrolysate is subsequently subjected to the action of bacterial alpha-amylase or a saccharifying enzyme to obtain a starch hydrolysate having a D.E. of from about 20 to about 43.

In a preferred embodiment, the acid-enzyme technique comprises subjecting a mixture of starch and water having a solids content of from about 10% to about 50% by weight to the hydrolytic action of acid at a pH of from about 1 to about 4 to obtain a hydrolysate having a D.E. between about 5 and about 15; and subjecting the resulting hydrolysate to the hydrolytic action of bacterial alpha-amylase at a temperature of from about 50° C. to about 95° C. at a pH of from about 6 to about 8 to further hydrolyze the hydrolysate to a D.E. of from about 20 to about 43.

After termination of the hydrolysis, the resulting conversion syrups have a solids content below about 50% by weight. Refining of the syrups is achieved by conventional refining methods, such as treating with vegetable carbon, ion exchange resins, filtration, centrifugation, and the like.

EXAMPLE I

The following specific procedures illustrate the above-described basic methods for preparing the starch hydrolysate used in this invention, and their use in producing products in accordance with the present invention.

Method A.—One-step enzyme technique

An aqueous starch slurry is prepared containing 30% solids by weight of waxy milo starch. A bacterial alpha-amylase is added; for example, 0.03% dry basis Miles HT-1000. The temperature of the slurry is raised and held between 80° C. and 95° C. The mixture is held at this temperature for about one-half to two hours. The temperature can then be reduced to about 80° C. and the conversion is allowed to continue until the desired D.E. is reached. The conversion is terminated by lowering the pH of the conversion product to about 4.0 to 5.0 with the addition of dilute hydrochloric acid solution.

Method B.—Two-step enzyme-enzyme technique

Unmodified corn starch is slurried in water to provide an aqueous suspension containing 28-32% by weight of the unmodified corn starch. The pH is at 7.5-8.0. To this mixture is added bacterial alpha-amylase, for example, Miles HT-1000, in an amount of 0.05% based on starch solids. This starch-enzyme suspension is added over a 30 minute period to an agitated tank maintained at a temperature of 80°-95° C. After completion of starch addition, liquefaction is continued for about 60 minutes, after which time the hydrolysate is within the D.E. range of 2 to 5. The liquefied starch is then heated to 150° C. and held at this temperature for 8 minutes. The heat treatment results in improved filtration rates and in decreased yield losses upon filtration of the final hydrolysate. The liquor is then cooled to 80°-90° C., redosed with enzyme, and allowed to convert to the desired D.E., between about 20 to about 43.

Method C.—Two-step, acid-enzyme technique

A sample of corn starch is slurried in water providing a slurry having a concentration ranging from 14° to 22° Baumé. This slurry is acid hydrolyzed to about 5 D.E. After acid hydrolysis, the slurry is neutralized to a pH between 6 and 7. The neutralized liquor is cooled to between 80° C. and 90° C., and dosed with bacterial alpha-amylase (HT-1000). A final D.E. of 20 to 43 is obtained in each of the samples in a period of time between 2 and 24 hours.

When fluids of different concentrations are separated by a semipermeable membrane, the more dilute solution will flow through the membrane into the more concentrated solution. As a result of this flow, the level of the dilute solution will drop and the level of the concentrated solution will rise until an equilibrium is reached. The pressure difference between the levels of the two solutions is the osmotic pressure. When pressure in excess of the osmotic pressure is applied to the concentrated solution, the flow through the membrane is reversed and a dilute solution will flow from the concentrated solution. This procedure is referred to as reverse osmosis.

When a fluid containing a variety of components of varying mobility and/or molecular size, such as a starch conversion syrup, is subjected to reverse osmosis, the ionic constituents as well as the smaller molecules representing the higher D.E. fraction of the syrup will preferentially flow through the semipermeable membrane into a dilute solution on the other side.

In the process of the present invention, the starch conversion syrup having a D.E. of from about 20 to about 40 is subjected to reverse osmosis by contacting the syrup with one side of a semipermeable membrane at a pressure in excess of the osmotic pressure across the membrane, until the D.E. of the syrup has been reduced to from about 5 to about 18. While the application of any pressure to the concentrate stream in excess of the osmotic pressure across the membrane will produce reverse osmosis, a pressure in excess of 50 pounds per square inch is usually required. Furthermore, since the rate of mass transfer is directly proportional to pressure, exceedingly high pressures, such as those approaching the breaking point of the membranes used and typically ranging from about 500 to about 2500 pounds per square inch, are preferred.

The rate of permeation in reverse osmosis varies directly with temperature. An increase in the operating temperature of about 10° C. can increase the rate of permeation by as much as 100%. However, as the operating temperature is increased there is an increase in the tendency of the membrane to soften to the point of rupture. As a result, the reverse osmosis step of the process of the present invention is operated at as high a temperature as possible to obtain maximum permeation rates without causing the membranes to soften to the point of rupture. While operating temperatures ranging from about 10° C. to about 150° C. can generally be utilized, depending on the particular type of membrane employed, an operating temperature ranging from 30° C. to about 100° C. is preferred.

The rate of permeation in the reverse osmosis step of the process of the present invention, and the efficiency with which the D.E. of the starch conversion syrups is reduced to within the required range varies somewhat with the concentration of the conversion syrup employed. While high solids concentrations in the syrups are desirable for high yields of product, the lower solids concentrations favor permeation rates. As a result, intermediate solids concentrations in the syrups, such as those ranging form about 10% to about 40% by weight, are preferred.

The semipermeable membranes which can be utilized in the present process can be of the flat or uniplanar as well as of the tubular or hollow fiber type. Since the starch conversion syrups of the present process are aqueous fluids, the semipermeable membranes suitable for the reverse osmosis are generally hydrophilic in character. Exemplary material which can be used for the membranes are cellulose esters such as cellulose acetate, triacetate, formate, propionate, nitrate and mixtures of such esters; cellulose esters such as methyl, ethyl, hydrolyalkyl, carboxyalkyl and the like; regenerated cellulose; polyvinyl alcohols; casein and its derivatives; and similar polymeric materials such as acrylonitrile polymers.

The reverse osmosis step of the process of the present invention can be operated as a batch or continuous operation. A batch operation can constitute a simple, closed reverse osmosis cell or a number of reverse osmosis cells connected in parallel, wherein a given quantity of starch hydrolysate is partially permeated through a suitable membrane within the pressure and temperatures heretofore described until the D.E. of the remaining hydrolysate is reduced to the required value. Mixing of the hydrolysate during permeation can be effected to ensure more efficient and homogeneous operation.

A continuous operation can be effected by utilizing a reverse osmosis cell, wherein the starch hydrolysate is pumped through the cell at a particular rate for a given residence time. Permeation cells having flat membranes can be readily used for this procedure but a permeability apparatus comprising hollow fiber membrane elements, such as described in U.S. Pat. 3,228,876 is preferred. When a continuous procedure is utilized, the hydrolysate can be pumped through a series of cells or can be recycled until the desired reduction in D.E. has been obtained.

The process of the present invention is further illustrated in the following examples.

EXAMPLE II

A starch conversion syrup prepared in accordance with Example I having a D.E. of about 20 and a solids content of about 40% by weight is pumped through a reverse osmosis cell of the type described in U.S. Pat. 3,133,132, and which is equipped with a cellulose acetate membrane, at a pressure of about 1200 pounds per square inch, and at a temperature of about 55° C. The concentrated solution is recycled through the cell until the D.E. has been reduced to about 5 on a dry basis to yield a non-hazing starch conversion syrup of this invention.

EXAMPLE III

A starch conversion syrup prepared in accordance with Example I having a D.E. of about 25 and a solids content of about 20% by weight is pumped through a reverse osmosis cell of the type described in U.S. Pat. 3,133,132 and which is equipped with a cellulose acetate membrane, at a pressure of about 500 pounds per square inch, and at a temperature of about 30° C. The concentrated solution is recycled through the cell until the D.E. has been reduced to about 15 on a dry basis to yield a non-hazing starch conversion syrup of this invention.

EXAMPLE IV

A starch conversion syrup prepared in accordance with Example I having a D.E. of about 40 and a solids content of about 25% by weight is pumped through a reverse osmosis cell of the type described in U.S. Pat. 3,133,132 and which is equipped with a cellulose acetate membrane, at a pressure of about 2500 pounds per square inch, and at a temperature of about 75° C. The concentrated solution is recycled through the cell until the D.E. has been reduced to about 18 on a dry basis to yield a non-hazing starch conversion syrup of this invention.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

I claim:

1. A process for the production of a non-hazing starch conversion syrup having a D.E. of from about 5 to about 18 which comprises first hydrolyzing starch to a D.E. of from about 20 to about 40 and thereafter subjecting the resulting starch conversion syrup to reverse osmosis until the D.E. of the syrup has been reduced to from about 5 to about 18.

2. The process of claim 1, wherein the starch is corn starch.

3. The process of claim 1, wherein hydrolyzing starch comprises subjecting an aqueous slurry of starch having a solids content below about 50% by weight to the hydrolytic action of bacterial alpha-amylase.

4. The process of claim 1, wherein hydrolyzing starch comprises slurrying starch in water to a solids concentration of between about 10% and about 50% by weight, solubilizing the starch above the gelatinization temperature of the starch in the presence of bacterial alpha-amylase to hydrolyze the starch to a D.E. between about 2 and about 15, heating the starch hydrolysate to a temperature greater than about 95° C., cooling the starch hydrolysate to a temperature less than about 95° C., and subjecting the hydrolysate to further treatment with additional bacterial alpha-amylase to hydrolyze the starch to a D.E. between about 20 and about 40.

5. The process of claim 1, wherein hydrolyzing starch comprises subjecting a mixture of starch and water having a solids content of from about 10% to about 50% by weight to the hydrolytic action of acid at a pH of from about 1 to about 4 to obtain a hydrolysate having a D.E. between about 5 and about 15 and subjecting the resulting hydrolysate to the hydrolytic action of bacterial alpha-amylase at a temperature from about 50° C. to about 95° C. and at a pH of from about 6 to about 8 to further hydrolyze the hydrolysate to a D.E. of from about 20 to about 40.

6. The process of claim 1, which comprises first hydrolyzing starch to a D.E. of from about 20 to about 40 and thereafter subjecting the resulting starch conversion syrup to reverse osmosis by contacting the syrup with one side of a semipermeable membrane at a pressure in excess of the osmotic pressure across the membrane until the D.E. of the syrup has been reduced to from about 5 to about 18.

7. The process of claim 6, wherein the pressure in excess of the osmotic pressure ranges from about 500 to about 2500 pounds per square inch.

8. The process of claim 6, wherein the starch conversion syrup is subjected to reverse osmosis at a temperature of from about 10° C. to about 150° C.

9. The process of claim 6, wherein the starch conversion syrup is subjected to reverse osmosis at a solids concentration ranging from about 10% to about 40% by weight.

10. The process of claim 6, wherein the semipermeable membrane comprises a cellulose ester membrane.

11. The process of claim 6, which comprises first hydrolyzing starch to a D.E. of from about 20 to about 40 and thereafter subjecting the resulting starch conversion syrup to reverse osmosis by contacting the syrup at a solids concentration of from about 10% to about 40% by weight at a temperature of from about 30° C. to about 100° C., and at a pressure ranging from about 500 to about 2500 pounds per square inch across a semi-permeable membrane until the D.E. of the syrup has been reduced to from about 5 to about 18.

12. A process for the production of a non-hazing starch conversion syrup having a D.E. of from about 5 to about 18 which comprises subjecting a starch hydrolysate syrup having a D.E. of from about 20 to about 40 to reverse osmosis until the D.E. of the syrup has been reduced to from about 5 to about 18.

13. A process for treating starch which comprises subjecting starch to hydrolysis with an acid or an enzyme or a combination of both an acid and an enzyme to produce a starch hydrolysis and subjecting the said hydrolysate to reverse osmosis by contacting the said hydrolysate on one side of a semi-permeable membrane at a pressure in excess of the osmotic pressure across said semipermeable membrane until the D.E. of the hydrolysate has been reduced to from about 5 to about 18 to thereby obtain a non-hazing low D.E. starch hydrolysate syrup.

14. A process in accordance with claim 13, wherein the D.E. of said hydrolysate subjected to reverse osmosis ranges from about 20 to about 43.

15. A process in accordance with claim 14, wherein the starch is hydrolyzed with an enzyme.

16. A process for treating starch to obtain a non-hazing low D.E. starch hydrolysate syrup which comprises subjecting starch to hydrolysis with an acid to produce a starch hydrolysate having a D.E. in the range of from about 20 to about 43 and subjecting the said hydrolysate to fractionation under substantial applied pressure on a semi-permeable membrane to obtain the non-hazing low D.E. starch hydrolysate syrup.

17. A process in accordance with claim 16 wherein the low D.E. value of said non-hazing low D.E. starch hydrolysate syrup is in the range of from about 5 to about 18.

18. A process in accordance with claim 17 wherein the dextrose equivalent value of the non-hazing low D.E. starch hydrolysate syrup is in the range of from about 5 to about 15.

(References on following page)

References Cited

UNITED STATES PATENTS

| | | | |
|---|---|---|---|
| 3,228,876 | 1/1966 | Mahon | 127—40 X |
| 2,571,541 | 10/1951 | Cleland | 127—40 |
| 3,490,922 | 1/1970 | Hurst | 99—142 |
| 2,410,264 | 10/1946 | Brock | 127—40 |
| 3,276,908 | 10/1966 | Idaszak | 127—40 |
| 3,668,007 | 6/1972 | Egger | 127—54 |

MORIS O. WOLK, Primary Examiner

S. MARANTZ, Assistant Examiner

U.S. Cl. X.R.

99—142; 127—54